United States Patent [19]

DeZuba et al.

[11] 3,896,123

[45] July 22, 1975

[54] SILYL CYANURATES

[75] Inventors: George P. DeZuba, Mechanicville; Abe Berger; Terry G. Selin, both of Schenectady, all of N.Y.

[73] Assignee: General Electric Company, Waterford, N.Y.

[22] Filed: Jan. 18, 1973

[21] Appl. No.: 324,778

Related U.S. Application Data

[60] Division of Ser. No. 241,831, April 6, 1972, abandoned, which is a continuation-in-part of Ser. No. 132,552, April 8, 1971, abandoned.

[52] U.S. Cl.. 260/248 CS; 260/46.5 E; 260/46.5 G; 260/32.6 A; 260/448.2 B
[51] Int. Cl............................................ C07d 55/50
[58] Field of Search ............................ 260/248 CS

[56] References Cited
UNITED STATES PATENTS

| | | | |
|---|---|---|---|
| 2,843,555 | 7/1958 | Berridge | 260/18 |
| 3,464,945 | 9/1969 | Martellock | 260/29.1 |
| 3,494,951 | 2/1970 | Berger | 260/448.2 |
| 3,517,001 | 6/1970 | Berger | 260/248 |
| 3,598,852 | 8/1971 | Berger | 260/448.2 |

*Primary Examiner*—John M. Ford
*Attorney, Agent, or Firm*—Donald J. Voss, Esq.; E. Philip Koltos, Esq.; Frank L. Neuhauser, Esq.

[57] ABSTRACT

A self-bonding, heat-vulcanizable silicone rubber composition comprising (a) an organopolysiloxane polymer of the formula $R_aSiO_{(4-a)/2}$, (b) a curing catalyst, and (c) an additive selected from cyanurates, isocyanurates, silyl-cyanurates and silylisocyanurates, where R is selected from monovalent hydrocarbon radicals and halogenated monovalent hydrocarbon radicals, a varies from 1.95 to 2.01. There may also be present in the above composition a process aid and a filler, as well as other ingredients.

3 Claims, No Drawings

SILYL CYANURATES

This application is a division of application Ser. No. 241,831, filed Apr. 6, 1972, which in turn is a continuation-in-part of application Ser. No. 132,552, filed Apr. 8, 1971, both now abandoned.

BACKGROUND OF THE INVENTION

The present invention relates to heat-curable silicone rubber compositions and, in particular, it relates to heat-curable silicone rubber compositions which are self-bonding to various substrates, such as plastics, metals or glass.

Up to the present time, whenever it was desired to prepare laminates with a silicone rubber layer therein, and particularly with a heat-curable silicone rubber layer therein, a substrate was covered with a primer and then the heat-curable silicone rubber composition was applied over the primer and the resulting composition was heated to cure the rubber. This method was used to make laminates, that is to laminate heat-curable silicone rubber to various substrates such as dacron fibers, nylon fibers, cotton, to produce gasketing materials, seals, hoses and other such articles. It was necessary to have the substrate, such as dacron in these cases, so as to result in the product having the desired high tensile strength. Further, whenever it was desired to bond heat-curable silicone rubber to substrates such as steel, aluminum or glass, it was necessary to use a primer before the heat-curable silicone rubber was applied to the substrate. Otherwise, the heat-curable silicone rubber would adhere very poorly to the substrate.

Whenever any type of silicone rubber is bonded to a substrate, it is desirable to have cohesive failure rather than adhesive failure. By cohesive failure it is meant that the cured silicone rubber ruptures before the bond between the silicone rubber layer and the substrate ruptures. By adhesive failure it is meant that the silicone rubber layer tears away from the substrate at the point where the substrate is in contact with the silicone rubber layer. In order to have cohesive failure with prior laminated articles that were formed with heat-curable silicone rubber, it was necessary to have a primer. The use of a primer not only involves an additional expense to the person or compounder who prepares the laminated article, but further it involves an extra step in the application of the heat-curable silicone rubber to the substrate. This extra step in the process of compounding the laminates, as can be seen, requires additional time which adds to the cost of producing such laminates. Accordingly, it would be desirable to prepare heat-curable silicone rubber which would bond strongly on various substrates so that there would be cohesive failure rather than adhesive failure when tension is applied to the silicone rubber layer.

British Pat. No. 119,829 discusses the use of triazines in conjunction with substituted phenols and other adhesive aids to bonding synthetic fibers to natural or synthetic rubber compositions. This combination of a triazine with phenols is undesirable in that it is expensive.

Further, the mixture of triazine and substituted phenols, as shown in the British patent, must be used with other adhesive aids or materials in order to provide an effective adhesive composition to bond the natural and synthetic rubber to synthetic fibrous materials.

Thus, it is an object of the present invention to provide a heat-curable silicone rubber composition that is self-bonding to all types of substrates.

It is another object of the present invention to provide a heat-curable silicone rubber composition that is self-bonding to various substrates and has good physical properties.

It is yet another object of the present invention to provide a heat-curable silicone rubber composition that is self-bonding to various substrates and results in cohesive failure when tension is applied to separate the rubber composition from the substrate.

It is still another object of the present invention to provide a heat-curable silicone rubber composition which can be stored for substantial periods of time and then can be cured on various types of substrates to provide a good bond between the silicone rubber composition and the substrate.

It is yet an additional object of the present invention to provide a process for preparing a heat-curable silicone rubber composition that will adhere to various substrates without the use of a primer and in which cohesive failure results when it is attempted to separate the silicone rubber layer from the substrate.

These and other objects of the present invention are accomplished by means of the composition and process set forth below.

SUMMARY OF THE INVENTION

There is provided by the present invention a self-bonding heat-vulcanizable silicone rubber composition comprising an organopolysiloxane polymer having a viscosity of at least 100,000 centipoise at 25°C of the formula, (1)
$$R_aSiO_{(4-a)/2}$$

a curing catalyst and an additive selected from the class consisting of an alkenylisocyanurate of the formula, (2)
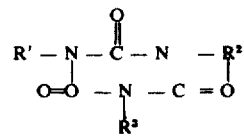

and a cyanurate of the formula, (3)
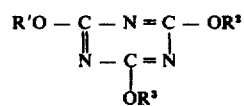

and mixtures thereof, where R is selected from monovalent hydrocarbon radicals and halogenated monovalent hydrocarbon radicals, R' is selected from unsaturated monovalent hydrocarbon radicals and unsaturated halogenated monovalent hydrocarbon radicals, R² and R³ are selected from R' radicals, saturated monovalent hydrocarbon radicals and saturated halogenated monovalent hydrocarbon radicals and a varies from 1.95 to 2.01, inclusive. In the above composition, there is preferably 82 to 99.65 percent by weight of the organopolysiloxane, 0.1 to 8 percent by weight of the curing catalyst and 0.25 to 10.0 percent by weight of the isocyanurate, based on the weight of the composition. There may further preferably be included in the composition a filler such as a silica filler, which comprises 20 to 60 percent by weight of the organopolysiloxane and there may also be present a process aid which comprises 1 to 25 percent by weight of the organopolysiloxane. The curing catalyst is preferably t-butyl perbenzoate or dicumyl peroxide.

There is also provided by the present invention a process for forming a self-bonding, curable silicone rubber composition which comprises taking the above components, mixing them and then heating the mixture to a temperature in the range of 80°C to 650°C, so as to cure the resulting mixture to a silicone rubber mass.

In the above composition, a critical ingredient is the isocyanurate and cyanurate. The non-silicone isocyanurate or cyanurate is preferred since it has very good shelf-aging properties. If shelf-aging is not an important factor, then there may be used in place of the isocyanurate of formula (2) or the cyanurate of formula (3) above, an additive selected from the class consisting of a silylisocyanurate of the formula, (4) 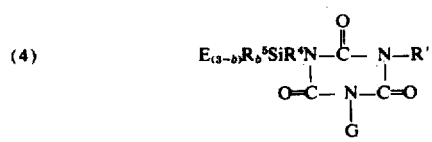

and a silylcyanurate of the formula, (5) 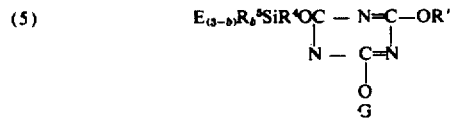

In the above formulas, R' is as defined previously, G is selected from R' radicals and radicals of the formula,

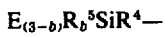

where E is selected from $R^6O-$ radicals and $R^6COO-$ radicals, where $R^5$ and $R^6$ are selected from monovalent hydrocarbon radicals and halogenated monovalent hydrocarbon radicals, $R^4$ is selected from divalent hydrocarbon radicals and halogenated divalent hydrocarbon radicals and b is a whole number equal to 0 to 3, inclusive. The silylisocyanurate and silylcyanurate of formulas (4) and (5) may have one silyl or two silyl substituent groups thereon on the isocyanurate moiety or cyanurate moiety, but preferably has only one silyl group thereon. Further, in the silylisocyanurates and silylcyanurate, preferably G is represented by an R' radical, that is, an unsaturated monovalent hydrocarbon radical.

DESCRIPTION OF THE PREFERRED EMBODIMENT

In the above formulas, that is, in formulas (1), (2), (3), (4) and (5), the radicals R, $R^5$ and $R^6$ may be aryl radicals and halogenated aryl radicals, such as phenyl, chlorophenyl, xylyl, tolyl, etc.; aralkyl radicals, such as phenyl, ethyl, benzyl, etc.; aliphatic, haloaliphatic and cycloaliphatic, such as alkyl, alkenyl, cycloalkyl, haloalkyl, including methyl, ethyl, propyl, chlorobutyl, cyclohexyl, etc.; cyanoalkyl radicals, such as cyanoethyl, cyanopropyl, cyanobutyl, etc. Preferably, the R radical is represented by methyl and phenyl radicals, where more than 50 percent of the R radicals are methyl. Further, in the organopolysiloxane polymer represented by formula (1), there is preferably 0.1 to 0.6 weight percent of the polymer of vinyl radicals. In addition, it is preferred that $R^5$ and $R^6$ be saturated hydrocarbon radicals of 1 to 8 carbon atoms, such as methyl, ethyl, etc. Radicals represented by R' are alkenyl radicals, cycloalkenyl radicals, and aralkenyl such as vinyl, allyl, cyclohexyl, phenyl-2-propenyl, etc. In addition, R' may be represented by alkynyl radicals, such as propargyl, etc. It is preferred that R' be selected from vinyl or allyl radicals. However, R' may be any unsaturated monovalent hydrocarbon radical having 2 to 20 carbon atoms, such as, for instance, octadecenyl. Radicals $R^2$ and $R^3$ may be the same radicals as R' and, in fact, it is preferred that either $R^2$ or $R^3$ can be an unsaturated hydrocarbon radical and, more preferably, that both $R^2$ and $R^3$ be unsaturated hydrocarbon radicals, such as vinyl or allyl. However, in addition, $R^2$ and $R^3$ may be saturated aliphatic radicals such as alkyl, cycloalkyl, haloalkyl, which includes methyl, ethyl, propyl, etc. In addition, $R^2$ and $R^3$ may be aromatic hydrocarbon radicals, such as aryl radicals, aralkyl radicals, etc. Radicals included by $R^4$ are divalent saturated and unsaturated hydrocarbon radicals, such as alkylene, alkenylene, alkynylene and arylene radicals and alkylenearylene radicals, such as ethylene, trimethylene, tetramethylene, phenylene, ethylenephenylene, Preferably, $R^4$ is ethylene, propylene or butylene. Isocyanurate compounds coming within the scope of formula (2) are trivinylisocyanurate and triallylisocyanurate. Preferred cyanurate compounds coming within the scope of formula (3) are trivinylcyanurate and triallylcyanurate. The preferred compound silylisocyanurate coming within the scope of formula (4) is trimethoxysilylpropenyldiallylisocyanurate. The preferred silylcyanurate compound within the scope of formula (5) is trimethoxysilylpropenyldiallylcyanurate. In either of the isocyanurates and cyanurates of formulas (2), (3), (4) or formula (5) it is necessary to have at least one unsaturated hydrocarbon group attached to the isocyanurate or cyanurate moiety as the case may be. Preferably, it is desirable to have two unsaturated hydrocarbon groups attached to the isocyanurate or cyanurate moiety, such as in the trimethoxysilylpropenyldiallylisocyanurate. However, as can be envisioned, the most preferable combination is where there are three unsaturated hydrocarbon groups attached to the isocyanurate or cyanurate moiety.

There are also within the scope of formula (1), polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of formula (1) which can contain both saturated and olefinically unsaturated hydrocarbon groups may be carried out by any of the procedures well known to those skilled in the art. Such polysiloxanes can be produced by following a procedure involving hydrolysis of one or more hydrocarbon-substituted dichlorosilanes in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150°C to produce and recover by evaporation a product consisting of low molecular weight cyclic polysiloxanes comprising, for example, about 85 percent of the tetramer and 15 percent of the mixed trimer and pentamer. When the hydrocarbons on the silicon atom are methyl, materials resulting from the presence of monomethyltrichlorosilane in this initial product produced from dimethyldichlorosilane remain as residue in the distillation vessel or tower.

The distillate consisting essentially of low molecular weight cyclic diorganopolymers, free of any significant amount of monofunctional and trifunctional groups, is collected in a vessel. The then dried cyclic siloxane contains less than 50 ppm of water. The cyclic dimethyl, methylvinyl and diphenyl cyclic siloxanes are prepared in the same way.

The pure cyclic siloxanes are added in the desired proportions in a reaction vessel so as to be subjected to an equilibration reaction to form the polysiloxanes of formula (1). Thus, about 1.5 – 17 mole percent cyclic diphenylsiloxane can be added to 82 – 97.5 mole percent dimethyl cyclic siloxanes. Then 0.1 – 1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added a polymerization catalyst, such as KOH. The KOH breaks the ring of cyclic siloxanes to form a potassium silanolate which has the formula,

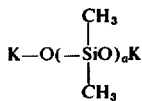

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chains and for stabilizing the polymers. Usually, a small amount of monofunctional compounds are added to function as end-blockers so as to regulate the chain length of the polymers. Preferably, a compound is used as the chain-stopped groups having the formula,

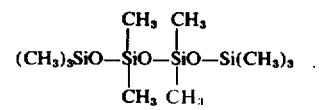

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until about 85 percent of the cyclic diorganosiloxanes have been converted to polymers end-stopped with monofunctional groups. When the 95 percent conversion point has been reached, there are just as many polymers being converted to the cyclic siloxanes as there are cyclic siloxanes being converted to the polymer. At that time there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50 – 4,000 mm per minute on a standard penetrometer. Further, the polymer preferably has a molecular weight in the range of 100,000 to 2 million and a viscosity of 100,000 to 100 million centipoise at 25°C.

Hydrocarbon-substituted polysiloxanes whose pendant groups consist largely of groups other than methyl, such as ethyl or other saturated hydrocarbon groups and olefinically unsaturated hydrocarbon groups other than, or in addition to, vinyl groups can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of trifunctional compounds, groups, or molecules to avoid cross-linking of linear polysiloxane chains through silicon and oxygen atoms and the incorporation therein of any significant amount of monofunctional compounds or radicals than those specifically provided to serve as end-blockers for limiting the degree of polymerization. Accordingly, the starting polydiorganosiloxane gum contains 2.0 hydrocarbon groups per silicon atom. Deviations from a ratio of 2 to 1. for example, ratios of 1.95 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

In producing the silicone rubber composition of the present invention, there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium, iron oxide, aluminum oxide, as well as the inorganic filler materials known as inert fillers which can include among others, diatomaceous earth, calcium carbonate and quartz, can preferably be employed in combination with highly-reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is preferably employed in the present compositions 10 – 100 percent by weight of said polysiloxane gum of the inorganic filler and preferably 20 to 60 percent by weight.

There is also employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula,

where R is a member selected from the class consisting of methyl and phenyl, X is a member selected from the class consisting of —OH, —NH$_2$ or —OR', where R' is methyl or ethyl, $n$ has a value of from 2 to 4, inclusive, and $b$ is a whole number equal to from 1 to 10, inclusive. Further details as to the properties, as well as the method of preparation of the compound of formula (3), are to be found in the disclosure of Martellock U.S. Pat. No. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as 35 and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120°C or hydrolyzing silanes of the formula $R_nSiX_{4-n}$ where X is any hydrolyzable group such as Cl, OH, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids is to be found in Konkle et al. U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

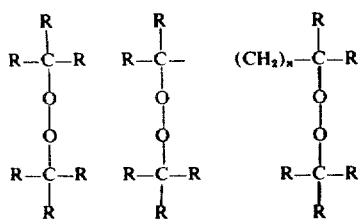

wherein R represents the same alkyl group throughout or alkyl groups of two or more different types and n is zero or a larger integer.

Among the specific peroxide curing catalysts that are preferred are di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, methylethylketone peroxide, azo-bis-isobutyronitrile, etc. Generally, 0.1 to 8 percent of said peroxide by weight of the polydiorganosiloxane gum is used to cure the silicone rubber composition and preferably 0.5 – 3.0 percent by weight of the above curing catalyst t-butyl perbenzoate is preferred.

The isocyanurates of formula (2) are prepared by taking cyanuric acid, which is a well known product to persons skilled in the art and which is easily available in the market, and reacting the cyanuric acid with an alkenyl chloride in the presence of a hydrogen chloride acceptor. If it is desired that all the three hydrogen atoms in the cyanuric acid be replaced by an alkenyl radical, then 1 mole of the cyanuric acid is reacted with 3 moles of the alkenyl chloride. If it is desired that one of the hydrogen atoms to be replaced by a saturated hydrocarbon radical while the other hydrogen atoms are replaced by an alkenyl radical, then the cyanuric acid is reacted with 2 moles of alkenyl chloride and 1 mole of an alkyl chloride. The molar proportions of alkenyl chloride, the alkyl chloride or the other type of aliphatic chloride, can be varied depending on the type of substitution desired on the cyanuric acid. Preferably, there is present 2 moles of alkenyl chloride per mole of cyanuric acid so that at least 2 of the hydrogen atoms in the cyanuric acid will be represented by an alkenyl radical.

Further, in place of, or in addition to, the alkenyl chloride, there may be used an alkynyl chloride so that at least 2 of the hydrogen atoms in the cyanuric acid would be replaced by an alkynyl radical. The reaction is preferably carried out in a temperature range of 100° to 250°C and preferably in the temperature range of 150° to 250°C. The type of hydrogen chloride acceptors that may be used are such compounds as tributylamine, sodium carbonate, trihexylamine, dimethylaniline, sodium hydroxide, etc. It is further preferred that the reaction be carried out in an inert solvent. Examples of such inert solvents are ortho-dichlorobenzenes, mesitylene, xylene, toluene, mineral spirits, etc. The reaction is allowed to proceed for 1 to 4 hours by which time it proceeds to completion. After the reaction period is over, the salts are filtered away and the isocyanurate of formula (2) is distilled off to obtain the pure product.

Another method for forming the isocyanurate of formula (2) is to react the alkenyl chloride with potassium cyanate and to reflux the mixture in the range of 100° to 200°C. Again, if it is desired that there be an alkenyl radical attached to each nitrogen atom, the potassium cyanate is reacted in equal molar amounts with the alkenyl chloride. For further details, the reader is referred to U.S. Pat. No. 2,697,720 and U.S. Pat. No. 2,866,803.

Further, as pointed out previously with the previous process, if it is desired that some of the radicals attached to the nitrogen atom be aliphatic or aromatic hydrocarbon substituents, there may be used in addition to the alkenyl chloride the desired amount of aliphatic chlorides so that the aliphatic chlorides may also react with the potassium cyanate to provide either 1 or 2 saturated aliphatic substituents attached to 1 or 2 of the nitrogen atoms. In terms of the most preferred compound of formula (2), it is preferred to use equal molar amounts of alkenyl chloride or alkynyl chloride with potassium cyanate, so that all of the hydrocarbon substituent groups attached to the nitrogen atoms are either alkenyl radicals or alkynyl radicals. However, as pointed out previously, there may be used a certain amount of saturated aliphatic chlorides so that there is a saturated aliphatic radical attached to one nitrogen atom and, less preferably, to two of the nitrogen atoms. Thus, the molar amounts of the reactants can be varied to obtain the products desired which are within the scope of formula (2). This reaction is preferably carried out in a solvent of cyclic or tertiary amides. Examples of such a solvent are dimethylformamide, N-methylpyrolidone, N,N-dimethylacetimide and dimethylsulfamide, etc. The reactants are refluxed for a period of 1 to 4 hours until the desired reaction product is formed. The reaction solution is then filtered to separate out the salts and then the reaction solution is distilled so as to boil off the pure desired reaction product of formula (2).

Included in the silylisocyanurates of formula (4) there are, for example, monosilylisocyanurates of the formula,

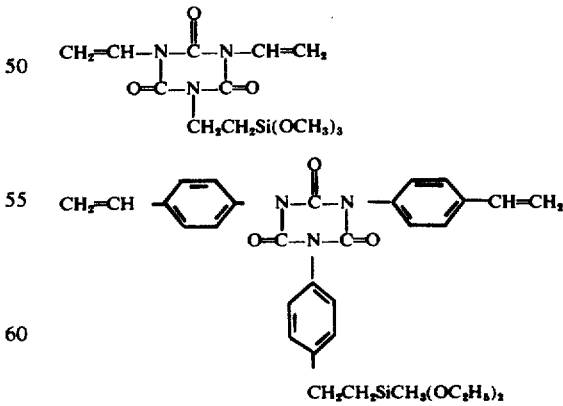

and disilylisocyanurates of the formula,

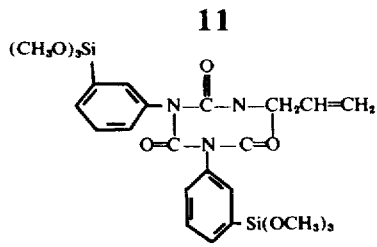

The silylisocyanurates of formula (4) can be made by effecting reaction between a silicon hydride of the formula, (6)

$$E_{(3-b)}R_b^5SiH$$

and an aliphatically unsaturated isocyanurate of the formula, (7)

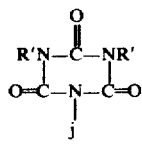

in the presence of an effective amount of platinum catalyst where E, $R^5$ and b are as defined previously, R' is as defined previously and can be an alkenyl or an alkynyl radical and j is selected from R' radicals.

Methods for making the silicon hydride of formula (6) are well known as shown in Organosilicon Compounds by Eaborn, p. 24, (1960), Butterworth Scientific Publications. The method for making the aliphatically unsaturated isocyanurates of formula (7) has been explained above and for further information one is referred to the publication by S. Herbsmen, Journal of Organic Chemistry, Vol. 30, p. 1259 (April 1965).

In the practice of the present invention, addition is effected between the silicon hydride of formula (6) and the aliphatically unsaturated isocyanurate of formula (7) in the presence of a platinum catalyst. Depending upon the degree of silyl substitution desired in the isocyanurate, there can be employed from about 1 to 2 moles of silicon hydride per mole of the aliphatically unsaturated isocyanurate. It must be remembered that in the isocyanurates which are useful in the present invention, there must be at least one free R' radical. Thus, when J is equivalent to an R' radical, then 1 or 2 moles of the silicon hydride may be reacted with 1 mole of the isocyanurate. Preferably, 1 mole of the silicon hydride of formula (6) is reacted with 1 mole of the isocyanurate of formula (7) so as to obtain substitution in only one R' radical with the silicon hydride molecule. On the other hand, if J is equivalent to an R radical, then only one mole of the silicon hydride can be reacted with one mole of the isocyanurate of formula (7) so as to obtain substitution in only one R' radical and leave the other R' radical free as is desired for the present invention. For example, equal molar amounts of the silicon hydride and the aliphatically unsaturated isocyanurate can favor the formation of the monosilylisocyanurate.

The order of addition of the various reactants is not critical. However, the degree of silylation of the aliphatically unsaturated isocyanurate can be influenced if the hydrosilation is conducted in the presence of an excess of either of the reactants. A higher degree of silylation can be favored, for example, if the aliphatically unsaturated isocyanurate is added to the silicon hydride in the presence of the platinum catalyst. Temperatures in the range of between 25° to 150°C have been found effective. It is preferred, however, to utilize temperatures between 85° to 100°C. Platinum catalysts which can be employed are, for example, chloroplatinic acid, platinum olefin complexes as shown in Ashby U.S. Pat. No. 3,159,662, platinum complexes shown by Lamoreaux, U.S. Pat. No. 3,220,972, both patents being assigned to the same assignee as the present invention, etc. An effective amount of platinum catalyst is that amount which is sufficient to provide from 0.01 to 500 parts of platinum per million parts of the hydrosilylation mixture. Recovery of the desired product can be achieved by standard recovery procedures, such as distillation, etc. Fractionation of the resulting mixture by standard procedures will provide for separation of the various components.

The cyanurates of Formula (3) are prepared by reacting cyanuric chloride with a sodium oxygen aliphatic unsaturated hydrocarbon compound in accordance with the following reaction,

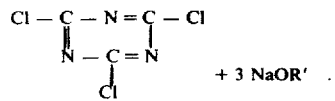

In the above reaction, R' is as previously defined, that is, it is selected from unsaturated monovalent hydrocarbon radicals and unsaturated halogenated monovalent hydrocarbon radicals. Thus, preferably, the R' radical is selected from alkenyl and alkynyl radicals and more preferably alkenyl radicals. If it is desired that all of the three chlorine atoms be substituted by an OR' group, then 3 moles of the sodium compound will be reacted with 1 mole of the cyanuric chloride. If on the other hand it is desired that some of the chlorine atoms be substituted by an oxy-saturated-hydrocarbon radical such as an oxyalkyl radical or oxycycloalkyl radical then there will be present in the reaction mixture only 1 or 2 moles of the NaOR' compound and the rest of the reactant will comprise 1 or 2 moles of the sodium oxy-saturated organic compound. It should be pointed out that in order for the resulting compound to come within the scope of the general formula of the cyanurates, that is, Formula (3), the $R^2$ or $R^3$ radicals can also be aryl radicals. Thus, if 1 mole of the NaOR' compound is reacted with 1 mole of cyanuric acid then there can be added to this reaction mixture 1 or 2 moles of an NaO-aryl-hydrocarbon compound. It is of necessity that the cyanuric chloride be reacted with at least one mole of the NaOR' compound so as to obtain at least one OR' group substituted for a chlorine atom in the cyanuric chloride since this is a necessity in the compounds within the preview of Formula (3). More preferably, there are substituted at least two OR' groups for two of the chlorine atoms in the cyanuric chloride. Thus, there is at least 2 moles of the NaOR; compound reacted with the cyanuric chloride so as to substitute two OR' moieties for two chlorine atoms, such that there will be two OR' moieties attached to the carbon atoms in the cyanuric ring. In this case, the third chlorine atom may be substituted by a saturated aliphatic or aromatic group such that the third chlorine atom may be substituted by an OR radical where R is as previously defined in connection with Formula (1).

Most preferably, 3 NaOR' moles are reacted per mole of the cyanuric chloride so that all three of the chlorine atoms will be substituted by an OR' group since the most preferred cyanurate within the scope of the present invention is obtained when there are three unsaturated hydrocarbon moieties attached to the cyanuric ring.

The above reaction is preferably carried out in a solvent which may be an ether solvent or an inert hydrocarbon solvent such as, xylene, toluene, or mineral spirits which solvent is used to dissolve the reactants so that there may be more intimate contact between the reactants. It is preferred not to use protonic solvents in this reaction such as amines or alcohols since they will react with the reactants. Preferably, the reaction is carried out at room temperature. In order to carry out the reaction at room temperature, it may be necessary to utilize cooling or refrigeration. To avoid the expense of such refrigeration, the reaction can be carried out in the temperature range of 60° to 100°C, which reaction temperature will result from the fact that the reaction is exothermic. Preferably, a solvent is used which has a reflux temperature between 60° to 100°C, so that during the reaction the solvent will reflux and thus dissipate the heat that is formed. The reaction of the two ingredients usually takes place at elevated temperatures in a period of 1 to 4 hours with the time period being closer to 1 hour at the elevated temperatures and the period being closer to 4 hours when the reaction mixture is cooled.

No catalyst is needed in this reaction and a catalyst is not normally used. At the end of the reaction time, the reactants are cooled to room temperature and the sodium chloride salt by-product of the reaction is removed by filtration through any well known clay or diatomaceous earth filter. The solvent that was used to carry out the reaction is then boiled off or stripped off and the cyanurate product is purified by distilling off a pure fraction from the reaction mixture or in the alternative by fractional crystallization. Both procedures are well known to a person skilled in the art.

The ingredient NaOR' is well known to a worker skilled in the art and does not need further discussion. Insofar as the preparation and availability of the cyanuric chloride is concerned, this product or ingredient is also well known to a person skilled in the art. However, for purposes of discussion, there will be stated in this specification the general procedure by which such cyanuric chloride can be prepared.

One simplified procedure is to trimerize or to react 3 moles of CNCl gas under pressure and in the presence of a catalyst at a temperature in the range of 200°–300°C or above for a period of 1 to 4 hours so as to obtain a composition in which there is a sizable percentage of cyanuric chloride. The reaction mixture is then cooled to room temperature and the cyanuric chloride is collected as a liquid from the reaction vessel and thus can be separated from the CNCl gas and other by-product reactants. The cyanuric chloride may then be further purified by well known distillation procedures.

Another method for forming the cyanuric chloride is to pyrolyze urea at temperatures in excess of 300°C. In such a pyrolyzation of urea there is formed cyanuric acid which has the formula,

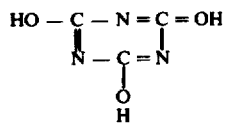

The reaction to produce the above-identified cyanuric acid is carried out preferably without the presence of a catalyst. The urea is merely pyrolyzed at temperatures in excess of 300°C in a pressure vessel with the pressure in excess of 100 psig to obtain a desirable amount of yield of the cyanuric acid product. At the end of that pyrolyzation procedure, the reaction chamber is cooled to room temperature and the cyanuric acid is separated from the unreacted urea and other by-products by methods well known in the art. The cyanuric acid is then taken and reacted with phosphorous pentachloride at temperatures that may be less than 100°C. This reaction also proceeds readily and a catalyst is not necessary. In addition, a solvent is not needed in this reaction since these reactants that is, the cyanuric acid and the phosphorous pentachloride, react with each other readily to form the cyanuric chloride without the necessity of a solvent and preferably within a temperature range of 50° to 100°C. This reaction of the cyanuric acid with the phosphorous pentachloride occurs readily in a period of time of less than 1 hour even in the absence of a catalyst and without the use of a solvent. The desired product, cyanuric chloride, is separated from the unreacted ingredients and other by-products by means well known in the art.

It should be pointed out that the reaction, that is, the trimerization of the CNCl gas, to produce cyanuric chloride usually takes place in a period of 3 to 9 hours. In addition, the reaction period for the pyrolyzation of urea in a pressure vessel also is allowed to proceed for 3 to 9 hours. While the pyrolyzation of urea can take place at atmospheric pressure it is preferred that the reaction be carried out with the reaction chamber at a pressure of 100 psig so as to increase the rate of the reaction and to obtain as high a yield as possible. In the case of the trimerization of the CNCl gas, it is of necessity that the reaction must be carried out at a pressure of at least 100 psig and more preferably at a pressure of 100 to 500 psig in a reaction vessel so as to obtain as high a yield of the cyanuric chloride as possible. Thus, in accordance with the above procedures, it is possible to obtain the cyanurates of Formula (3), which procedures are familiar to a worker skilled in the art.

The most preferred compound within the scope of Formula (3) and which is most desirable for use in the present invention is triallyl cyanurate and other types of trialkenyl cyanurates.

The silyl cyanurates of Formula (5) can be made by effecting the reaction between the silicon hydride of the Formula (6) above and an aliphatically unsaturated cyanurate of the formula, (8) 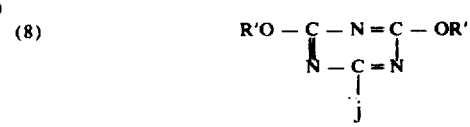

in the presence of an effective amount of platinum catalyst, where E, $R^5$ and $b$ are as defined previously and can be an alkenyl or alkynyl radical and j is as defined previously, that is, it is selected from R' radicals and R radicals which were defined previously. As noted before, the silicon hydride of Formula (6) is well known in the art. The method for making the aliphatically unsaturated cyanurates of Formula (8) has been explained above and is also well known in the art.

In the practice of the present invention, an addition is effected between the silicon hydride of Formula (6) and the aliphatically unsaturated cyanurate of Formula (8) in the presence of a platinum catalyst. Depending upon the degree of silyl substitution desired in the cyanurate, there can be employed from about 1 to 2 moles of silicon hydride per mole of the aliphatically unsaturated cyanurate. It must be remembered that in the silyl cyanurates as well as in the cyanurates which are useful in the present invention there must be at least one free R' radical in the molecule. Thus, when J is equivalent to an R' radical then 1 or 2 moles of the silicon hydride may be reacted with 1 mole of the cyanurate. Preferably, 1 mole of the silicon hydride of Formula (6) is reacted with 1 mole of the cyanurate of Formula (8) so as to obtain substitution in only one R' radical with the silicon hydride molecule. On the other hand, if J is equivalent to an R radical then only 1 mole of the silicon hydride can be reacted with 1 mole of the cyanurate of Formula (8) so as to obtain substitution in only one R' radical and leave the other R' radical free as is desired for the present invention. For example, equal molar amounts of the silicon hydride and the aliphatically unsaturated cyanurate favors the formation of the mono silyl cyanurate. The order of addition of the above reactants is not critical. However, the degree of silylation of the aliphatically unsaturated cyanurate can be influenced if the hydrosilation is conducted in the presence of an excess of either of the reactants. A higher degree of silylation can be a favor, for example, if the aliphatically unsaturated cyanurate is added to the silicon hydride in the presence of the platinum catalyst. Temperatures in the range of between 25° to 150°C have been found effective for the present process. It is preferred, however, as in the previous description, to utilize temperatures between 85° to 100°C. The platinum catalyst that can be employed are well known and have been referred to previously in the description between the reaction of the silicon hydride of Formula (6) and the isocyanurate of Formula (7). The effective amount of platinum catalyst that can be used in this reaction is the same as in the previous reaction with the isocyanurate, that is, that amount which is sufficient to provide from about 0.1 to 500 parts of platinum per million parts of the hydrosilation mixture. Recovery of the desired product can be achieved by standard recovery procedures such as, distillation and etc. Fractionation of the resulting mixture by standard procedures will provide for separation of the various components. It should be pointed out that in such hydrosilation reaction, the silicon atom of the silicon hydride of Formula (6) can be added on either to the alpha or beta unsaturated carbon atoms in the R' radical of the cyanurates of Formula (8), such that in the final silyl cyanurate product as represented by Formula (5), the silicon atom can be attached to either the alpha or beta carbon atom the $R^4$ radical. Thus, the product that is usually formed by the above reaction procedure, that is, the hydrosilation in the presence of a platinum catalyst, will most often result in mixture of products in which case in some of the product the silicon atom of the silicon hydride of Formula (6) will be substituted on the alpha carbon atom of the R' radicals of the cyanurates of Formula (8), and in some of the product the silicon atom of the silicon hydride of Formula (6) will be substituted on the beta carbon atom of the R' radical of the cyanurates of Formula (8). These two types of products, that is, the alpha addition product and the beta addition product, can be separated if necessary by well known methods such as, crystallization and distillation. However, this is not necessary in the present invention since a mixture of these two compounds as produced with the above-described reaction is suitable for use in the present invention, that is, as an additive to the self-bonding heat-curable polysiloxane composition of the present invention.

It should also be pointed out that this type of alpha and beta addition will also occur in the hydrosilation reaction in the case where the silicon hydride of Formula (6) is reacted with the isocyanurate of Formula (7), and that the products of such a hydrosilation reaction will include both alpha addition products and beta addition products which products need not be separated or distinguished but can be used as produced from the reaction mixture as an additive in the self-bonding heat-curable silicone rubber composition of the present invention.

The organic isocyanurate or cyanurate of Formulas (2) and (3) or the silylisocyanurate or silylcyanurate of Formulas (4) and (5) are utilized in the composition of the present case in the amounts of 0.25 to 10.0 percent by weight of the composition. Less than 0.25 weight percent does not render the resulting composition self-bonding. An excess of 10 percent by weight of the isocyanurates or cyanurates does not increase the self-bonding properties of the cured polysiloxane rubber but further, in addition, tends to degrade the properties of the cured silicone rubber. Preferably, the isocyanurates or cyanurates are used in the composition in the range of 1.0 to 4.0 percent by weight.

The most preferred silylcyanurate is trimethoxysilylpropylenediallylcyanurate.

In addition to the fillers, process aid, curing catalyst and the isocyanurate or cyanurate, the organopolysiloxane composition of the present invention can also contain structure control additives, pigments, heat stabilizers, etc. Examples of heat stabilizers are iron oxide, arylurethanes, etc., which can be employed in proportions up to 5 parts per 100 parts of the organopolysiloxane polymer of Formula (1). In the practice of the invention, the organopolysiloxane composition is produced by forming a mixture of the organopolysiloxane polymer, filler, process aid and isocyanurate or cyanurate material, a structure control additive and a heat stabilizer. The order of addition of the various ingredients is not critical. For example, the various ingredients or mixtures can be blended together by use of standard rubber mixing equipment, such as a doughmixer, rubber mill, Banbury and the like. One procedure, for example, is to add the filler to the polymer while it is being milled, followed by the addition of the isocyanurate, or silylisocyanurate, or cyanurate or silylcyanurate or a mixture thereof, heat stabilizers, plasticizers, curing catalysts, etc.

Another procedure which can be employed is to doughmix the polymer and filler and add the isocyanurate material, curing catalyst, etc., to the polymer filler blend while it is milled in the rubber mill. Those skilled in the art would know, depending upon the properties desired in the final cured product and applications to which the cured product is to be employed, the nature and amount of the particular ingredients utilized and the manner of blending to produce the desired organopolysiloxane compositions. The organopolysiloxane composition can be converted to the solid, elastomeric state at temperatures in the range of from 80° to 650°C, depending upon the nature of the curing catalyst, duration of the cure, amount and type of filler, etc. The direct conversion of the organopolysiloxane composition to the cured, solid, elastic state can be effected as a result of the conditions normally utilized during the conventional molding, extrusion and calendering operations. For example, depending upon the curing catalyst used, a temperature of 80° to 300°C can be employed for compression and transfer molding for either 30 minutes or more, or a minute or less. Hot air vulcanization temperatures from 150° to 650°C or steam vulcanization at temperatures between 110° to 210°C can be employed for periods of from 5 to 10 minutes or a matter of seconds during extrusion operation, again depending upon the curing catalyst used.

Those skilled in the art would know, in view of the application for which the cured product is intended, the particular means to be utilized in any particular situation. If desired, the cured product of the present invention can be oven-cured following the fabrication treatment after it has achieved optimum properties without adverse effects. Irrespective of the type of curing used, the organopolysiloxane mixed with the filler, process aid, curing catalyst and isocyanurate or cyanurate, can be applied directly on the substrate with which the laminate is formed.

The heat-curable polysiloxane composition of the present case will self-bond to various synthetic fiber substrates, such as dacron, nylon, heat-resistant nylon, glass cloth, rayon, cotton, wool, acetate fibers, acrylate fibers, teflon and polyester fibers. It will also self-bond with good adhesion so as to produce cohesive rupture upon being tested with natural fibers, such as wool and cotton. Further, this self-bonding composition of the present case will bond to plastic substrates, such as polycarbonates, polyvinyl chloride plastics, polyethylene plastics, polypropylene plastics, polyester plastics, polyamide plastics, teflon plastic and other types of plastics.

Other substrates to which the heat-curable silicone rubber composition will bond to result in cohesive failure upon being tested is steel substrates, aluminum substrates, glass substrates, concrete, copper and wood. In fact, the heat-curable self-bonding silicone rubber composition of the present case will self-bond to almost all known substrates with such a strong bond that upon being tested there will be cohesive failure rather than adhesive failure.

In the above procedure for mixing and curing the organopolysiloxane, there was mentioned many different types of methods. Particularly, it is preferred that the different ingredients, such as the organopolysiloxane polymer, the silica filler, the process aid and the isocyanurate or cyanurate additives, the curing catalyst and the other ingredients be first mixed in a doughmixer and then be placed on a calender. Then, the mixture can be calendered onto a substrate, and particularly a synthetic fiber substrate. Of course, the silicone rubber composition of the present case cannot be milled onto a brittle substrate or a hard substrate such as glass or steel. However, with synthetic fiber or soft plastic substrates that are flexible, the silicone rubber composition of the present case is preferably milled or calendered onto the substrate and then press-cured from 1 minute to 2 hours at a temperature in the range of 150° to 250°C or at a temperature in the range of 200° to 400°F. In the case where the substrate is brittle or hard and unflexible so that it cannot be milled or calendered together with the silicone rubber composition of the present case, then the silicone rubber composition is preferably milled in the form of a sheet and the sheet is applied to the substrate and press-cured.

As pointed out previously, the isocyanurate or cyanurate additives of either Formulas (2), (3), (4) or (5) are added and milled or doughmixed into the organopolysiloxane polymer, filler, process aid and curing catalyst mixture. The resulting composition may then be used immediately so as to bond and cure on the substrate, or it may be placed and stored for a period of time. A silicone rubber composition of the present case containing the isocyanurate or cyanurate of Formulas (2) and (3) can be stored indefinitely without any adverse effects to the self-bonding properties of the composition when it is finally applied to substrates and cured. However, when the silylisocyanurates or silylcyanurates of Formulas (4) and (5) are used as an additive in the composition of the present case, then it is preferred to use the composition within 3 months after it has been prepared.

Another method in which the silicone composition of the present case can be applied to various fibers is by the dip-coating method. That is, the composition of the present case as defined above is dissolved in a solvent such as xylene so as to obtain 15 to 50 percent solids solution and then the fibers or other elongated pieces of fabric or other type of substrate is dipped into the solution, taken out of the solution and heated within a period of one minute to 30 minutes at a temperature within the range of 300° to 400°C, to evaporate the solvent and cure the composition of the present case onto the fabric substrate. If desired, the fabric having the coating of self-bonding heat-cured silicone composition of the present case can be redipped as many times as desired into the solution to obtain successive layers of silicone rubber covering the fabric in order to obtain the desired thickness of silicone rubber on the fabric. As pointed out previously, and will be indicated below, the compositions of the present case were prepared and cured on various substrates to determine whether there would be cohesive or adhesive failure when the adhesion of the silicone rubber layer was tested on the substrate to which it was applied. In the tests indicated in the examples below a Tinius Olsen tester which reads in pounds per inch of pull is used. The procedure in carrying out the test with the machine was to mix the organopolysiloxane polymer with a process aid, filler, isocyanurate or cyanurate and curing catalyst in a doughmixer and then take the resulting mixture and mill it so as to obtain two sheets of substantially the same thickness on two sections of the same substrate. The two sections of the same type of substrate were then brought together so that the silicone rubber sheets touched one another. The resulting laminate was placed in a mold and cured for a period of time from 1 minute to 60 minutes in the temperature ranges indicated above. Before the laminate was cured, there was placed in one part of the laminate a spacer between the two sheets of silicone rubber. After the laminate had been cured, the spacer was removed and the substrates and silicone rubber were cut along the sides in the area of the spacer so that two strips were formed from the laminate which could be put on the Tinius Olsen tester. The tester was then started and the pull was measured until there was adhesive or cohesive failure. In order that those who are skilled in the act will be able to understand the practice of the present invention, the following examples are given by way of illustration and not by way of limitation. All parts are by weight.

EXAMPLE 1

A polydimethylsiloxane gum having the formula,

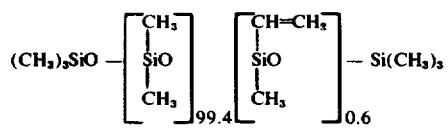

is mixed with 15 parts of an alkoxy-stopped dimethyldlphenylpolysiloxane process aid. To this mixture there is added 60 parts of fumed silica and the mixture is thoroughly mixed in a doughmixer. After the mixture is thoroughly mixed in the doughmixer, it is placed on the mill and there is milled into it per 100 parts of the mixture, 0.25 part of t-butyl perbenzoate as a curing catalyst, which composition is hereinafter referred to as Composition A. To different samples of Composition A there is added the self-bonding additives enumerated in Table 1. The silicone rubber sheets that are formed are placed on sheets of unprimed, undyed dacron fiber. These sheets are press-cured for a period of 6 minutes at a temperature of 300°C. At the end of that time, the sheets are subjected to the Tinius Olsen Test specified above. From the initial samples of Composition A mixed with the various additives, there are also taken further samples which are aged 7 days, 14 days and 6 months.

These further samples which are applied to unprimed, undyed dacron fiber and press-cured for the same time and at the same temperature as the unaged samples, are then subjected to the Tinius Olsen test. The self-bonding additives which are within the scope of the present invention and enumerated in Table 1 are triallylisocyanurate, tri($\Delta$-9-octadecyl)isocyanurate, methyldivinylisocyanurate, tripropenylisocyanurate, ethyldibutenylisocyanurate, and trihexynylisocyanurate. The bond strength as determined by the Tinius Olsen test discussed above using the various self-bonding additives at various concentrations and at various self-aging times is given in Table 1 below:

The above results indicate that the various self-bonding additives enumerated in Table 1 give very good adhesion to undyed, unprimed dacron fiber which is, in fact, much better than that using primers on the dacron and then applying on top of the primer lever the heat-curable silicone rubber material. Further, the above self-bonding additives enumerated in Table 1 are shown to have superior self-aging properties such that even after a 6 month period, the gum, filler, process aid, curing agent, and selfbonding additive mixture has the same self-bonding capabilities as it did on the day that the mixture was prepared.

EXAMPLE 2

There is prepared a mixture of the polysiloxane gum of Example 1 with 20 parts of the process aid of Example 1 and 40 parts of silica filler. These compounds are mixed in the doughmixer until there is obtained a uniform mixture which is referred to as Composition B. Different samples of Composition B are taken and samples are placed on a mill and there are milled into the samples 0.25 part of dicumyl peroxide per 100 parts of the samples. There is also milled into the samples different amounts of the self-bonding additives enumerated in Table II below per 100 parts of Composition B. The resulting sheets are placed on the various substrates set forth in Table II below such as stainless steel, bare aluminum, alcohol aluminum, cold rolled steel, glass and the resulting laminates are either press-cured in a press for 360 seconds at 400°F or cured in an air oven at 300°F. The cured laminates are then subjected to a shear test comprising taking 1 square inch of the sheets prepared as stated above and placing them on a 1 inch wide strip of substrate. Then a 1 inch wide strip of substrate is placed above the silicone rubber sheet and the resulting laminate is cured. The cured laminate comprising a lever of substrate, a layer of silicone rubber and a layer of substrate is then placed in a testing machine which pulls the substrates apart and the resulting force required to separate the substrates is measured in pounds per square inch as distinguished from the tests of Example 1 which measures the force necessary to separate the silicone rubber layer from the substrate in pounds per inch. There was also prepared a sample sheet in which no self-bonding additive was used, both for the press-cured samples and for the over-cured samples. Further, glass silicone rubber layer laminates cannot be placed on a testing machine because of the brittleness of the glass. However, by merely pulling the silicone rubber layer from the glass substrate, it is possible to determine whether the failure was cohesive or adhesive. The results of the tests are indicated in Table II below. In this Table II, after the pounds per square inch of pull failure of the laminate, there is indicated by a C whether the failure is cohesive or by an A whether the failure is indicated to be adhesive.

TABLE I

| | | Bond Strengths and Shelf Stability Bond Strengths in lbs/in. | | | | |
| Self-Bonding Additives | phr | 0 Days | 7 Days | 14 Days | Six Months | % Retention |
| --- | --- | --- | --- | --- | --- | --- |
| Triallylisocyanurate | 1.0 | 40–57 | 44–60 | 44–55 | 42–55 | 100 |
| Tri($\Delta$-O-octadecenyl)-isocyanurate | 0.75 | 38–50 | 40–55 | 44–58 | 40–50 | 100 |
| Methyldivinylisocyanurate | 0.80 | 38–55 | 42–60 | 45–55 | 42–58 | 100 |
| Tripropenylisocyanurate | 1.25 | 45–60 | 48–62 | 46–61 | 44–58 | 100 |
| Ethyldibutenylisocyanurate | 1.50 | 42–65 | 48–60 | 47–63 | 44–60 | 100 |
| Trihexynylisocyanurate | 2.00 | 55–70 | 60–75 | 62–75 | 54–68 | 100 |

TABLE II

BOND STRENGTH FOR DIFFERENT TYPES OF SUBSTRATES IN PSI

| Self-Bonding Additive | Cure | phr | Stainless Steel | Bare Aluminum | Alclad Aluminum | Cold Rolled Steel | Glass |
|---|---|---|---|---|---|---|---|
| Trimethoxysilylpropyl-diallylisocyanurate | Press | 1.25 | 550/C | 370/C | 480/C | 733/C | C |
| Trimethoxysilylpropyl-diallylisocyanurate | Press | 1.45 | 590/C | 400/C | 500/C | 753/C | C |
| Trimethoxysilylpropyl-diallylisocyanurate | Press | 1.00 | 520/C | 300/C | 480/C | 720/C | C |
| Triethoxysilylpropyl-diallylisocyanurate | Press | 0.85 | 610/C | 450/C | 500/C | 780/C | C |
| Trimethoxysilylpropyl-diallylisocyanurate | Press | 1.50 | 700/C | 500/C | 550/C | 820/C | |
| None | | | 186/A | 30/A | 0/A | 193/A | A |
| Trimethoxysilylpropyl-diallylisocyanurate | 1 Hour/ 300°F | 2.00 | 700/C | 276/C | 740/C | 857/C | C |
| None | 1 Hour/ 500°F | | 196/C | 90/A | 0/A | 250/A | A |

As indicated by Table II with the self-bonding additives of the present invention incorporated into silicone rubber Composition B, there is obtained a laminate which is at least twice as strong as the laminate obtained without the use of the self-bonding additives. Further, without the self-bonding additives in all cases the failure was adhesive, while with the self-bonding additives of the present invention in all cases the failure of the laminate was cohesive.

In addition to 100 parts of Composition B, there is milled 1.25 parts of triallylisocyanurate and 0.25 part of t-butyl perbenzoate. The mixture that is formed is calendered on 2.0 mil strip of etched teflon and press-cured for 20 minutes at 300°F. A similar mixture of Composition B, with no self-bonding additive and with 0.25 part of t-butyl perbenzoate, is calendered on 2.0 mil thick strip of etched teflon and press-cured for 20 minutes at 300°F. The laminate that is formed having no self-bonding additive permitted the etched Teflon to be peeled off easily from the silicone rubber layer. In the case where the laminate contained the silicone rubber composition with triallylisocyanurate therein, the etched teflon layer cannot be peeled off the silicone rubber layer.

To another sample of 100 parts of Composition B there is added 0.25 part of t-butyl perbenzoate and 1.25 parts of trimethoxysilylpropyldiallylisocyanurate. This resulting mixture is milled into a sheet from which there is taken a 1 inch square, which is then placed between two 1 inch wide strips of plywood and the resulting laminate is press-cured for 360 seconds at 400°F. When tension is applied to the resulting laminate, the plywood ruptured before there was any failure of the bonding of the silicone layer to the plywood layer.

EXAMPLE 3

A composition having the exact same standard heat vulcanizable silicone rubber ingredients in the same exact amounts as in Example 1 is prepared, which hereinafter will be referred to again as Composition A, which Composition A is the same as Composition A of Example 1.

To different samples of Composition A, there is added the cyanurate additives enumerated in Table III below with the parts of the additives per 100 parts of Composition A shown in the phr column. Then self-bonding additives are milled into various samples of Composition A as such so as to form sheets of Composition A with the self bonding additive milled and uniformly mixed throughout these sheets. Some of the sheets are immediately placed on sheets of unprimed, undyed dacron fiber and the laminate is press-cured for a period of 360 seconds at a temperature of 300°C. The cured laminate is then placed on a Tinius Olsen testing machine and the strength of the bond in the laiminate in lbs/in. is determined as listed in Table III below. The other samples of the sheets of Composition A and the various additives are shelf aged for periods of time from 7 days to 14 days and 6 months. At the end of each shelf aging period the samples that are shelf aged for that period are taken and placed on sheets of unprimed, undyed dacron fiber and the resulting laminates are press-cured at 300°C for a period of 360 seconds. The laminates are then subjected to testing on a Tinius Olsen machine and the results of these tests are listed in Table III below.

These self-bonding additives enumerated in Table III which are within the scope of the present invention and are triallyl cyanurate, methyldivinylcyanurate, tripropenylcyanurate, tributenylcyanurate, methyldiallylcyanurate and trimethoxypropenylsilyldiallylcyanurate. The bond strength of the laminates as determined by the Tinius Olsen test of the various sheets containing the various additives indicated in Table III are listed in the various columns of Table III. The figures in the percent retention column in Table III below indicate the difference in the bond strength of the samples that are aged for 6 months as compared to the bond strength of the unaged samples. In all cases except for the case where the self-bonding additive was a silylcyanurate, it is noted that the percent retention in bond strength is 100 percent. In the case where the trimethoxypropenylsilyldiallylcyanurate self-bonding additive is used, it is indicated that the percent retention is still as high as 93 percent.

TABLE III

| Self-Bonding Additives | phr | BOND STRENGTHS AND SHELF STABILITY BOND STRENGTHS IN LBS/IN. | | | | % Retention |
| --- | --- | --- | --- | --- | --- | --- |
| | | 0 Days | 7 Days | 14 Days | Six Months | |
| Triallylcyanurate | 1.0 | 60–65 | 57–62 | 61–66 | 56–63 | 100 |
| Methyldivinylcyanurate | 1.2 | 55–60 | 52–58 | 50–58 | 53–58 | 100 |
| Tripropenylcyanurate | 1.4 | 60–70 | 58–66 | 58–65 | 62–72 | 100 |
| Tributenylcyanurate | 1.5 | 63–72 | 60–68 | 62–70 | 65–70 | 100 |
| Methyldiallylcyanurate | 1.7 | 65–75 | 66–76 | 63–70 | 68–77 | 100 |
| Trimethoxypropenylsilyldiallylcyanurate | 2.0 | 75–85 | 72–82 | 70–80 | 68–78 | 93 |

The above results enumerated in Table III show the superiority of the self-bonding additives of the present invention so as to result in a heat-curable silicone rubber composition laminate with superior bond strength to fibrous materials as well as other materials as shown in Example 2. In particular, the results of Table III indicate the advantages of the cyanurate self-bonding additives in producing a superior self-bonding, heat-curable silicone rubber composition and particularly a self-bonding, heatcurable silicone rubber composition which can be applied to various fibrous materials for the purpose of forming a silicone rubber fibrous material laminate. The results of Table III also show the superior shelf-life of the self-bonding additives of the present invention.

We claim:
1. A silyl cyanurate of the formula,

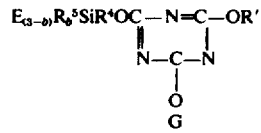

where G is selected from R' radicals, $E_{(3-b)}R_b^5SiR^4$— radicals and R radicals, E is selected from $R^6O$— and $R^6COO$— where R, $R^5$ and $R^6$ are selected from the class consisting of lower alkyl radicals and halo lower alkyl radicals, R' is a lower alkenyl radical, $R^4$ is a lower alkylene radical, b is a whole number varying from 0 to 3, inclusive, and wherein the Si atom may be attached to either the alpha or beta carbon atom in the $R^4$ radical.

2. The silyl cyanurate of claim 1 wherein R, $R^5$ and $R^6$ is methyl, G is R' and R' is selected from the class consisting of vinyl and allyl.

3. A silyl cyanurate of claim 1 being trimethoxysilylpropylenediallylcyanurate.

* * * * *